United States Patent [19]
Wilson

[11] 3,753,488
[45] Aug. 21, 1973

[54] SAFETY DEVICE FOR A SLACK TAKE-UP WEIGHT OF A BELT CONVEYOR

[75] Inventor: Robert Laverne Wilson, Abilene, Kans.

[73] Assignee: The Ehrsam Company, Abilene, Kans.

[22] Filed: July 6, 1972

[21] Appl. No.: 269,334

[52] U.S. Cl. ................................. 198/208, 187/94
[51] Int. Cl. ............................................ B65g 15/30
[58] Field of Search .................................. 198/208; 74/242.11 L, 242.11 W; 248/364; 24/244 R; 187/94; 188/189

[56] References Cited
UNITED STATES PATENTS 2,633,977   4/1953   McMillan ........................... 198/208
1,132,769   3/1915   Gale .................................... 187/94

Primary Examiner—Evon C. Blunk
Assistant Examiner—Douglas D. Watts
Attorney—Eldon H. Luther and Robert L. Olson

[57] ABSTRACT

A safety device for a slack take-up weight of a belt conveyor, which includes a pair of guide members positioned on either side of the weight. The guide members are substantially vertical, being at a slight angle thereto, with the bottom ends closest together. If the conveyor belt breaks, the falling weight is gradually slowed down, and eventually stopped by the wedging action of the guide rails.

1 Claim, 3 Drawing Figures

PATENTED AUG 21 1973
3,753,488
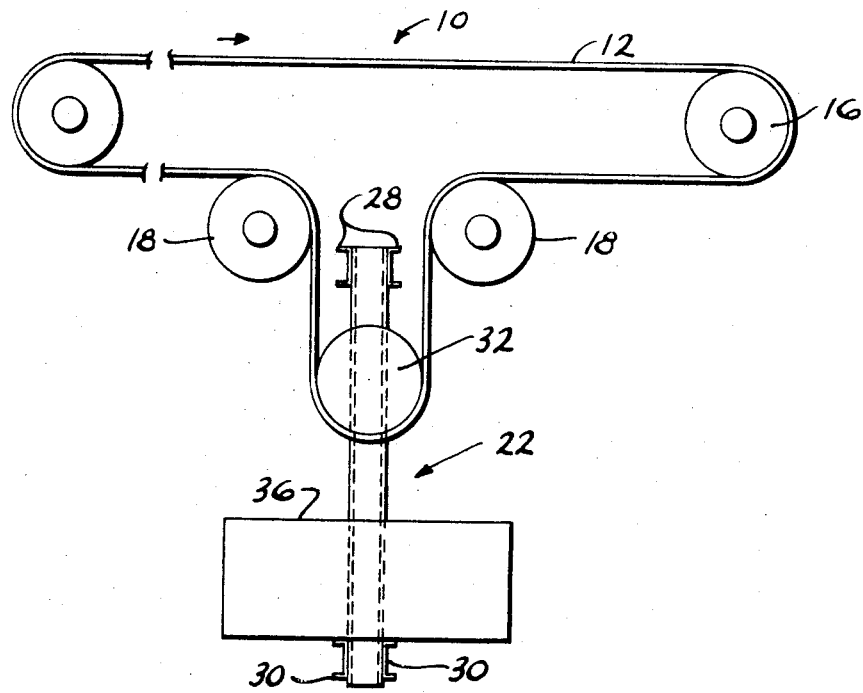
FIG-1
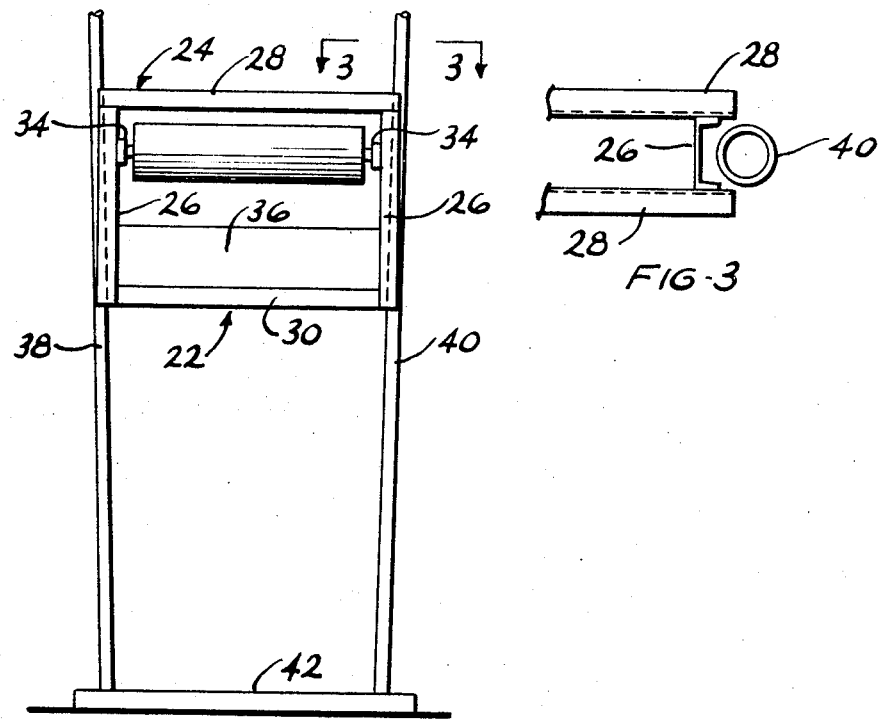
FIG-2
FIG-3

SAFETY DEVICE FOR A SLACK TAKE-UP WEIGHT OF A BELT CONVEYOR

BACKGROUND OF THE INVENTION

Endless conveyor belts are frequently maintained in tension by means of a slack take-up weight suspended from the lower run of the belt. Upon wear and eventual breakage of the belt the weight can free fall, causing considerable damage to equipment and structure located beneath it. Various structures have been used in the past for preventing the weight from free falling when the conveyor belt breaks. These structures have been complex and expensive, and in many instances require a good deal of maintenance to make sure they are in proper working order.

SUMMARY OF THE INVENTION

The safety device for a slack take-up weight of the present invention includes a pair of guide rails positioned on either side of the weight. The guide rails slope downwardly towards each other. When the conveyor belt breaks, allowing the weight to free fall, the weight is gradually slowed down and stopped as it is pinched within the narrowing space between the sloping guide rails.

BRIEF DESCRIPTION OF THE DRAWING

FIG. 1 is a sectional side view of a safety device for a slack take-up weight of a belt conveyor;

FIG. 2 is an enlarged front view of the weight and its associated safety device therefore, with the conveyor belt being omitted; and FIG. 3 is a view taken on line 3—3 of FIG. 2.

DESCRIPTION OF THE PREFERRED EMBODIMENT

Referring to FIG. 1, numeral 10 designates a conveyor system having an endless conveyor belt 12, the upper run of which is supported by a head pulley 14 and a tail pulley 16. One or both of these pulleys are rotatably driven by a motor (not shown) to cause movement of the belt. The lower run of the belt 12 is supported by idler rollers 18.

In order to maintain proper tension in the upper run of the conveyor belt 12, a slack take-up weight arrangement 22 is suspended from the lower run of the belt. The weight arrangement 22 includes a frame 24, which is made up of side members 26, top member 28, and lower member 30. Rotatably mounted within the frame 24 by means of journals 34 is a roller 32. Secured to the frame 24 beneath the roller 32 is a box 36. This box can be filled with bricks, cement or other material to provide the necessary or desired weight. A suitable weight may be a ton or more.

The frame 24 is sandwiched between guide rails 38 and 40, which holds the weight arrangement stationary while the belt 12 rolls therepast on roller 32. During the normal operation of the conveyor system, the weight arrangement 22 provides for the proper tensioning in belt 12 at all times. As the belt stretches, the weight moves downwardly, guided by the coaction of guide rails 38, 40, with the sides 26 of the frame 24 (see FIG. 3).

As best seen in FIG. 2, the pipes or guide rails 38, 40 slope downwardly and inwardly, and are secured at their bottom ends to channel bar 42, which is fixed to the floor. Depending on the size of pipes 38, 40 in relation to the weight of the entire weight arrangement 22, it may also be desirable to fasten the upper ends of pipes 38, 40 to strengthening members. Thus, as the belt 12 is subjected to expansion and stretching, the weight arrangement 22 is free to move downwardly, guided by the pipes 38 and 40. If the belt 12 breaks, the weight arrangement 22 free falls until the lower member 30 of frame 24 reaches line A—A of FIG. 2. At this point, the frame starts binding within the guide rails 38, 40. This binding or wedging action will gradually slow, and eventually stop the weight arrangement 22, by absorbing the kinetic energy of the falling weight before it reaches the floor, thus preventing damage. It is possible to size the pipes 38, 40 such that they will be slightly flattened while stopping the weight member, if excessively large pipes cannot be economically used. This may require replacement of the guide rail pipes 38, 40 on occasion. This does not entail any large expense, and they can be easily replaced if necessary.

What is claimed is:

1. A safety device for checking an abnormal fall of a belt supported counterweight of a conveyor belt take-up, comprising a conveyor belt means, a weight member, means connecting the weight member to the conveyor belt means in such a manner that it keeps the upper surface of the conveyor belt means taut, a pair of substantially upright guide members positioned on opposite sides of the weight member, said guide members being positioned such that they coact with means on the weight member to guide the weight member in up and down movement along a vertical axis, each of the guide members also being positioned such that each forms an angle to an extension of the vertical axis of the weight member, the lower ends of each guide member being closer to the vertical axis than their upper ends thereof, so that in the event the conveyor belt breaks, the falling weight member is gradually slowed down and stops as it becomes wedged between the guide members.

* * * * *